J. R. Creighton.
Shutter Worker.
Nº 8,647.                Patented Jan. 13, 1852.
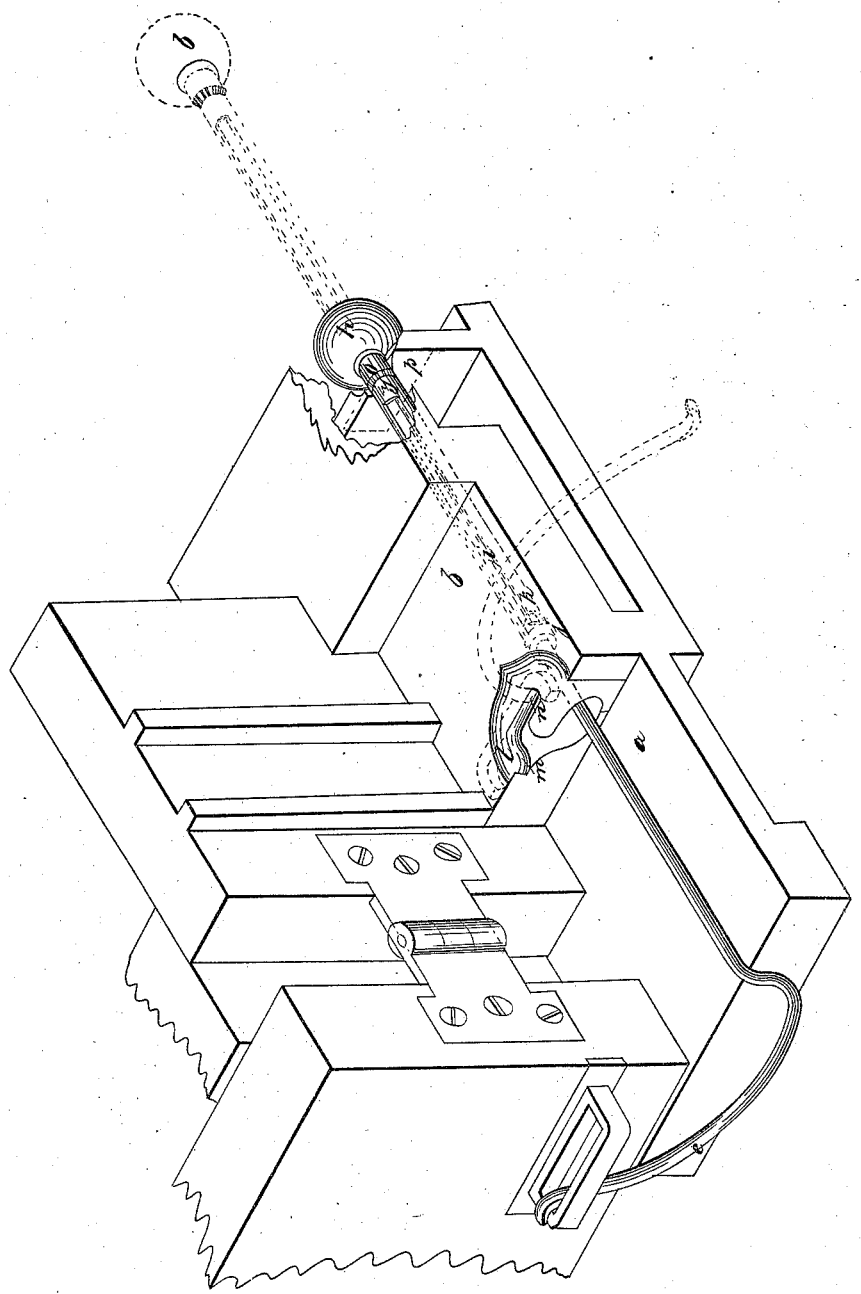

UNITED STATES PATENT OFFICE.

JAS. R. CREIGHTON, OF CINCINNATI, OHIO.

BLIND AND SHUTTER OPERATOR.

Specification of Letters Patent No. 8,647, dated January 13, 1852.

*To all whom it may concern:*

Be it known that I, JAMES R. CREIGHTON, of Cincinnati, Ohio, have invented new and useful Improvements in Window-Blind Operators and Fasteners; and I do hereby declare the following to be a full, clear, and exact description thereof, reference being had to the annexed drawing, making part of this specification.

It is my aim in this contrivance to provide an efficient blind operator that shall be free from some of the objections to those now in use, such as—interference with the hinge—difficulty or labor of attachment—liability to fracture or derangement by breaking of cogs or otherwise. By this arrangement also, the shutter when closed is firmly attached to the sill, by an arrangement additional to that which fastens it when open.

In the annexed perspective drawing (*a*) is the sill, (*b*) the sub-sill, (*c*) is a portion of a blind or shutter, (*d*) is a staple attached to the inner side (when closed) of the blind near to the lower edge and near the lower hinge; (*e*) is the curved or hooked extremity of a rod (*f*) which has both longitudinal and rotary play in a hole made in the sub-sill for that purpose.

(*g*) is a tubular rod terminating at the extremity which projects into the room, in a handle (*h*) and inclosing the rod (*f*) which slides in it. This tube (*g*) has a groove or slit (*i*) along one side of it so as to permit the longitudinal traversing of a tooth or projection (*j*) on the end of the rod (*f*) when the tube is to be slipped into the sill. This tube has also a notch (*k*) at the outer extremity of the slit or groove (*i*), which notch receives the tooth (*j*) of the rod (*f*) when it is desired to thrust the rod outward. (*l*) is a catch placed at the outer extremity of the hole in the sill and having an opening (*m*) in its side communicating with a notch (*n*) for the reception of the hook (*e*) and retention of the blind when closed. Upon the tubular rod (*g*) near the handle are serrations or teeth (*o*), which, when the handle is pushed home fit within notches in a plate (*p*) attached to the sill and by this means enable the operator to fasten the blind in any desired position.

The operation is as follows: The blind being supposed folded open against the wall as represented in the annexed drawing, and the rod (*f*) being extended and its hook lying over in the staple and holding the blind back, the hook being prevented from rotation by the teeth (*o*) interlocking with teeth in the plate (*p*)—First draw the handle back so as to clear the teeth (*o*), then turn the handle so as to cause the hook to swing upwards and over drawing with it the blind, which having reached a point past the middle of its sweep is brought shut by a simple pull at the handle. It is fastened by the hook entering the notch of the catch (*l*) and being thrown over into a position indicated by dotted lines in the drawing—having accomplished half a revolution in the operation of closing and fastening the handle is then pushed into its socket which prevents the hook being removed from the catch by tampering with it from the outside. When the blind is to be opened the handle is withdrawn from its socket to the full stretch of the tube and rotated so as to bring the tooth (*j*) on the rod (*f*) into the notch (*k*) in the tube (*g*) so as to enable it to project the rod outwards, and the hook (*e*) being by these actions released from the catch (*l*) the hook is thrust outward and eventually rotated until the end of the hook rests upon the staple (*d*), when the handle being thrust home the blind is retained in position by the hook being prevented from rotating. To retain the blind in any intermediate position the handle has only to be thrust home when the blind has reached that point. When additional security is desired the hook (*e*) may be so continued as that its extremity when the blind is closed shall drop through another staple on the blind and into a mortise in the sill.

Having thus fully, clearly and exactly described the nature construction and operation of my improvement in window blind openers and fastener what I claim therein as new and desire to secure by Letters Patent is—

The sliding extension rod (*f g*) provided with the bent arm or hook (*e*), groove (*i*), notch (*k*) and tooth (*j*) as described, in combination with the staple (*d*), catch (*l*) and serrated neck (*o*) fitting into a corresponding socket in the plate (*p*), whereby the shutter or blind is opened or closed by manipulation from the inside and retained in position when open by the fallen bent arm in the staple, and when closed by the introduction of the bent arm into the notch in the catch (*l*); the serrated neck (*o*) with its corresponding socket in the plate (*p*) preventing the bent arm from being dislodged from either position by tampering from the outside.

In testimony whereof, I have hereunto set my hand before two subscribing witnesses.

JAMES R. CREIGHTON.

Witnesses:
EDWARD H. KNIGHT,
GEO. H. KNIGHT.